(12) United States Patent
Otani

(10) Patent No.: US 8,444,487 B2
(45) Date of Patent: May 21, 2013

(54) GAME DEVICE, GAME DEVICE CONTROL METHOD, PROGRAM, AND INFORMATION STORAGE MEDIUM

(75) Inventor: Taku Otani, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/382,727

(22) PCT Filed: Feb. 24, 2010

(86) PCT No.: PCT/JP2010/052893
§ 371 (c)(1),
(2), (4) Date: Jan. 6, 2012

(87) PCT Pub. No.: WO2011/004629
PCT Pub. Date: Jan. 13, 2011

(65) Prior Publication Data
US 2012/0115596 A1 May 10, 2012

(30) Foreign Application Priority Data

Jul. 7, 2009 (JP) ................................. 2009-161138

(51) Int. Cl.
*A63F 9/00* (2006.01)

(52) U.S. Cl.
USPC ........... 463/36; 463/1; 463/7; 463/30; 463/37

(58) Field of Classification Search
USPC ....................................... 463/1, 7, 30, 36–37
See application file for complete search history.

(56) References Cited

U.S. PATENT DOCUMENTS

| 8,016,673 | B2 * | 9/2011 | Takatsuka ........................ 463/32 |
| 2003/0144045 | A1 * | 7/2003 | Fujita ................................. 463/1 |
| 2007/0091084 | A1 | 4/2007 | Ueshima et al. | |
| 2008/0261696 | A1 | 10/2008 | Yamazaki et al. | |
| 2010/0234103 | A1 * | 9/2010 | Matsumaru ...................... 463/30 |
| 2012/0115610 | A1 * | 5/2012 | Otani et al. ...................... 463/36 |

FOREIGN PATENT DOCUMENTS

| JP | 2001-104636 A | 4/2001 |
| JP | 2008-194282 A | 8/2008 |
| JP | 2008-264195 A | 11/2008 |

\* cited by examiner

*Primary Examiner* — Dmitry Suhol
*Assistant Examiner* — David Duffy
(74) *Attorney, Agent, or Firm* — Sughrue Mion, PLLC

(57) ABSTRACT

Provided is a game device capable of preventing a subject to be operated from performing an action that is not intended by a player. The game device (10) executes a game configured such that at least one of the subject to be operated by the player and a plurality of objects or characters moves within a game space. Numerical value information acquiring means (51) acquires numerical value information corresponding to a motion of the player. Control means (52) causes the subject to be operated to perform an action for dealing with a first object or a first character in a case where the numerical value information satisfies a condition. Condition changing means (55) changes the condition based on a position of at least one of the subject to be operated and the object or the character. The condition changing means (55) makes a setting so that the numerical value information is less likely to satisfy the condition for a case where the object or the character to be subsequently dealt with by the subject to be operated is a second object or a second character, compared to the condition for a case where the object or the character to be subsequently dealt with by the subject to be operated is the first object or the first character.

19 Claims, 6 Drawing Sheets

GAME DEVICE, GAME DEVICE CONTROL METHOD, PROGRAM, AND INFORMATION STORAGE MEDIUM

TECHNICAL FIELD

The present invention relates to a game device, a method of controlling a game device, a program, and an information storage medium.

BACKGROUND ART

There is known a game device which obtains numerical value information based on a motion of a player and causes a subject to be operated to perform an action based on the numerical value information (for example, Patent Literature 1).

PRIOR ART DOCUMENT

Patent Document

[Patent Document 1] JP 2008-264195 A

DISCLOSURE OF THE INVENTION

Problems to be Solved by the Invention

For example, a game device including a board-type controller capable of detecting a weight and a position of the center of gravity of a player can detect that the player has moved the center of gravity by putting their weight on one leg or that the player has squatted down. Therefore, it is conceivable, with such a game device, to realize a game configured such that a player character performs a jumping action when the player moves the center of gravity and that the player character performs a squatting action when the player squats down.

For example, in an attempt to squat down in order to cause the player character to perform the squatting action, the player may involuntarily move the center of gravity. In such a case, if the player character performs the jumping action due to the movement of the center of gravity of the player, this means that the player character has performed an action that was not intended by the player. As a result, the player may feel dissatisfied. Therefore, to realize the above-mentioned game, it is necessary to prevent the player character from performing the action that is not intended by the player.

The present invention has been made in view of the above-mentioned problem, and an object thereof is to provide a game device, a method of controlling a game device, a program, and an information storage medium, which are capable of preventing a subject to be operated from performing an action that is not intended by a player.

Means for Solving the Problems

In order to solve the above-mentioned problem, according to the present invention, there is provided a game device, which executes a game configured such that at least one of a subject to be operated by a player and a plurality of objects or characters moves within a game space, including: numerical value information acquiring means for acquiring numerical value information corresponding to a motion of the player; and control means for causing the subject to be operated to perform an action for dealing with an object or a character based on the numerical value information, in which the control means includes: means for causing the subject to be operated to perform an action for dealing with a first object or a first character in a case where the numerical value information satisfies a condition; and condition changing means for changing the condition based on a position of at least one of the subject to be operated and the object or the character and making a setting so that the numerical value information is less likely to satisfy the condition for a case where the object or the character to be subsequently dealt with by the subject to be operated is a second object or a second character, compared to the condition for a case where the object or the character to be subsequently dealt with by the subject to be operated is the first object or the first character.

Further, according to the present invention, there is provided a method of controlling a game device which executes a game configured such that at least one of a subject to be operated by a player and a plurality of objects or characters moves within a game space, including: a numerical value information acquiring step of acquiring numerical value information corresponding to a motion of the player; and a control step of causing the subject to be operated to perform an action for dealing with an object or a character based on the numerical value information, in which the control step includes: a step of causing the subject to be operated to perform an action for dealing with a first object or a first character in a case where the numerical value information satisfies a condition; and a condition changing step of changing the condition based on a position of at least one of the subject to be operated and the object or the character and making a setting so that the numerical value information is less likely to satisfy the condition for a case where the object or the character to be subsequently dealt with by the subject to be operated is a second object or a second character, compared to the condition for a case where the object or the character to be subsequently dealt with by the subject to be operated is the first object or the first character.

Further, according to the present invention, there is provided a program for causing a computer, such as a consumer game machine (stationary game machine), a portable game machine, an arcade game machine, a mobile phone, a personal digital assistant (PDA), or a personal computer, to function as a game device which executes a game configured such that at least one of a subject to be operated by a player and a plurality of objects or characters moves within a game space, the program further causing the computer to function as: numerical value information acquiring means for acquiring numerical value information corresponding to a motion of the player; and control means for causing the subject to be operated to perform an action for dealing with an object or a character based on the numerical value information, in which the control means includes: means for causing the subject to be operated to perform an action for dealing with a first object or a first character in a case where the numerical value information satisfies a condition; and condition changing means for changing the condition based on a position of at least one of the subject to be operated and the object or the character and making a setting so that the numerical value information is less likely to satisfy the condition for a case where the object or the character to be subsequently dealt with by the subject to be operated is a second object or a second character, compared to the condition for a case where the object or the character to be subsequently dealt with by the subject to be operated is the first object or the first character.

Further, an information storage medium according to the present invention is a computer-readable information storage medium storing the above-mentioned program.

According to the present invention, it is possible to prevent the subject to be operated from performing an action that is not intended by the player.

Further, according to an aspect of the present invention, the control means may further include means for causing the subject to be operated to perform the action for dealing with the first object or the first character in a case where a numerical value based on the numerical value information is larger than a reference value. The condition changing means may set the reference value for the case where the object or the character to be subsequently dealt with by the subject to be operated is the second object or the second character to a value larger than the reference value for the case where the object or the character to be subsequently dealt with by the subject to be operated is the first object or the first character.

Further, according to an aspect of the present invention, the control means may further include means for causing the subject to be operated to perform the action for dealing with the first object or the first character in a case where a numerical value based on the numerical value information is smaller than a reference value. The condition changing means may set the reference value for the case where the object or the character to be subsequently dealt with by the subject to be operated is the second object or the second character to a value smaller than the reference value for the case where the object or the character to be subsequently dealt with by the subject to be operated is the first object or the first character.

Further, according to an aspect of the present invention, the condition changing means may make a setting so that the numerical value information is less likely to satisfy the condition for a case where a distance between the subject to be operated and the second object or the second character is shorter than a reference distance, compared to the condition for a case where a distance between the subject to be operated and the first object or the first character is shorter than the reference distance. The condition changing means may include reference distance changing means for changing the reference distance based on a moving speed of at least one of the subject to be operated and the object or the character.

MODE FOR CARRYING OUT THE INVENTION

Hereinafter, detailed description is given of an example of an embodiment of the present invention with reference to the drawings. A game device according to the embodiment of the present invention is implemented by, for example, a consumer game machine (stationary game machine), a portable game machine, a mobile phone, a personal digital assistant (PDA), or a personal computer. Here, description is given of a case where the game device according to the embodiment of the present invention is implemented by a consumer game machine.

Figure 1:
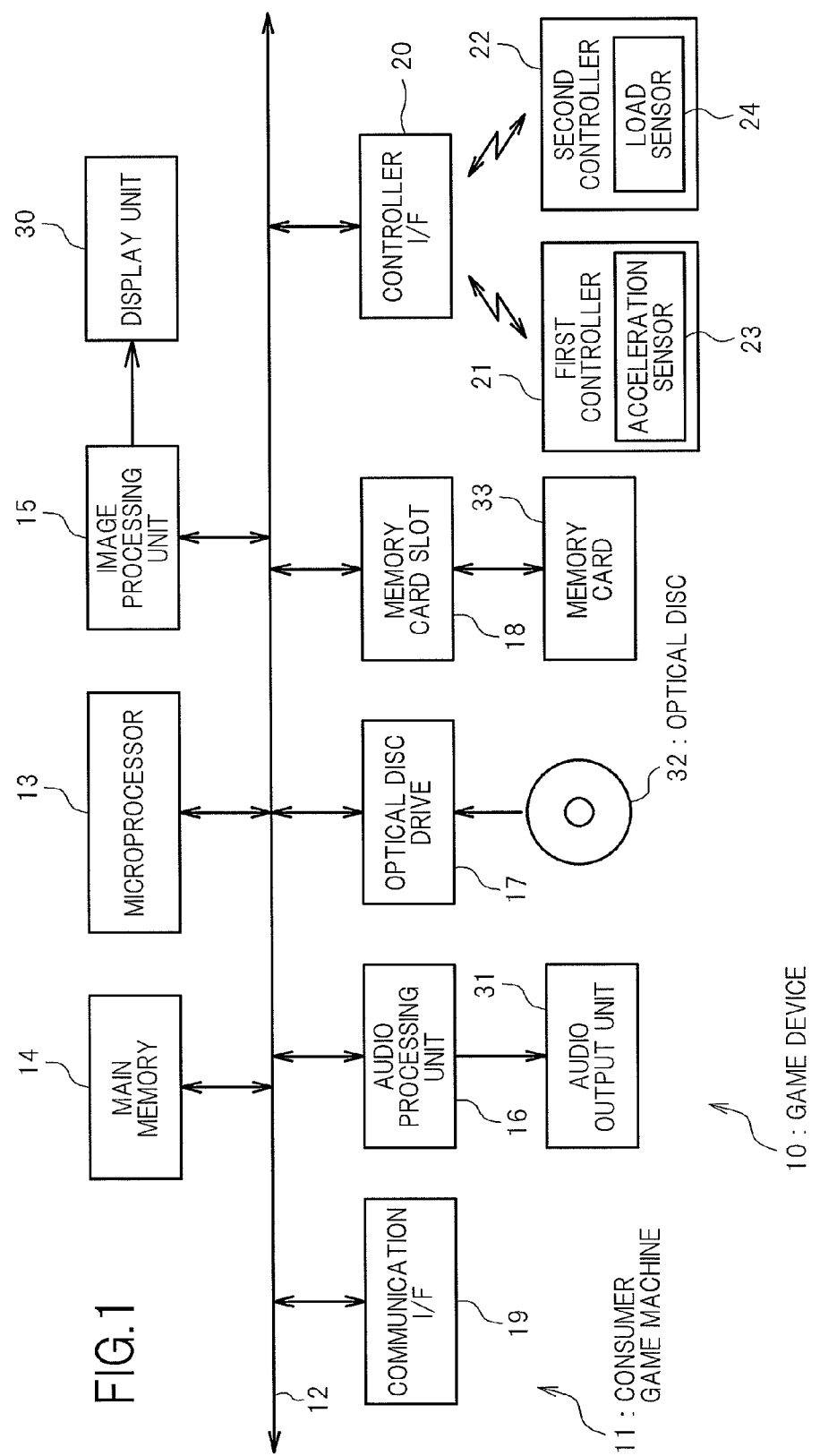
[FIG. 1] A diagram illustrating a hardware configuration of a game device according to an embodiment of the present invention.

FIG. 1 illustrates a hardware configuration of the game device according to the embodiment of the present invention. As illustrated in FIG. 1, a game device 10 according to the embodiment of the present invention includes a consumer game machine 11, a display unit 30, an audio output unit 31, an optical disc 32, and a memory card 33. The display unit 30 and the audio output unit 31 are connected to the consumer game machine 11. For example, a consumer television set is used as the display unit 30, and a speaker built into the consumer television set is used as the audio output unit 31. The optical disc 32 and the memory card 33 are information storage media, and are mounted to the consumer game machine 11.

The consumer game machine 11 is a well-known computer game system. The consumer game machine 11 includes a bus 12, a microprocessor 13, a main memory 14, an image processing unit 15, an audio processing unit 16, an optical disc drive 17, a memory card slot 18, a communication interface (I/F) 19, a controller interface (I/F) 20, a first controller 21, and a second controller 22.

The bus 12 is provided for exchanging addresses and data among the units of the consumer game machine 11. The microprocessor 13, the main memory 14, the image processing unit 15, the audio processing unit 16, the optical disc drive 17, the memory card slot 18, the communication interface 19, and the controller interface 20 are connected via the bus 12 so as to communicate data with one another.

The microprocessor 13 executes various kinds of information processing based on an operating system stored in a ROM (not shown) and a program read from the optical disc 32 or the memory card 33. The main memory 14 includes, for example, a RAM. The program or data read from the optical disc 32 or the memory card 33 are written into the main memory 14 if necessary. The main memory 14 is also used for working memory of the microprocessor 13.

The image processing unit 15 includes a VRAM, and renders, based on image data sent from the microprocessor 13, a game screen in the VRAM. Then, the image processing unit 15 converts the game screen into video signals and outputs the video signals to the display unit 30 at predetermined times. The audio processing unit 16 includes a sound buffer and outputs, from the audio output unit 31, various kinds of sound data (game music, game sound effect, message, and the like) read from the optical disc 32 to the sound buffer.

The optical disc drive 17 reads the program or data recorded on the optical disc 32. In this case, the optical disc 32 is used for supplying the program or data to the consumer game machine 11, but any other information storage medium such as the memory card 33 may also be used. Further, the program or data may also be supplied to the consumer game machine 11 via a data communication network such as the Internet.

The memory card slot 18 is an interface for mounting the memory card 33. The memory card 33 includes a nonvolatile memory (for example, EEPROM), and stores various kinds of game data such as saved data. The communication interface 19 is an interface for communicative connection to a data communication network such as the Internet.

The controller interface 20 is an interface for allowing the first controller 21 and the second controller 22 to perform wireless connection. It is possible to use, for example, an interface conforming to the Bluetooth (registered trademark) interface standards as the controller interface 20. Note that the controller interface 20 may be an interface for allowing the first controller 21 and the second controller 22 to perform wired connection.

Figure 2:
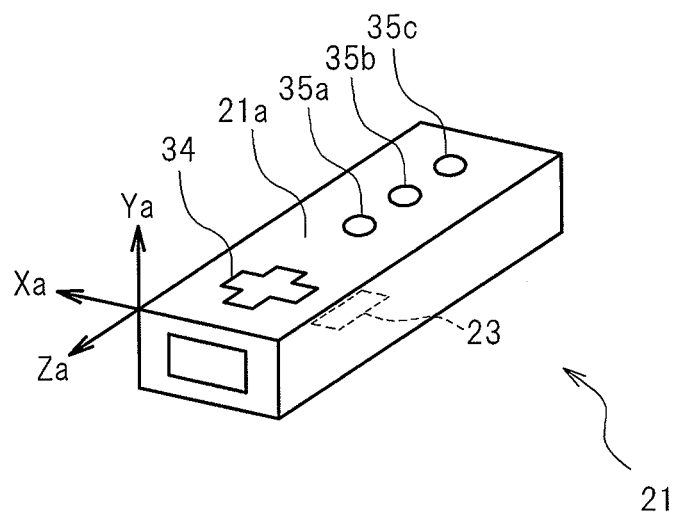
[FIG. 2] A diagram illustrating an example of a first controller.

FIG. 2 is a diagram illustrating an example of the first controller 21. The first controller 21 is an operation unit for receiving a player's operation. As illustrated in FIG. 2, the first controller 21 is a stick-type controller, and includes a direction button 34 and buttons 35a, 35b, and 35c.

In addition, the first controller 21 includes an acceleration sensor 23. The acceleration sensor 23, for example, detects accelerations in an Xa-axis direction, a Ya-axis direction, and a Za-axis direction, which are orthogonal to one another, and outputs a numerical value indicating a detection result thereof. For example, as illustrated in FIG. 2, the Xa-axis direction corresponds to a shorter side direction of the first controller 21, and the Za-axis direction corresponds to a longer side direction of the first controller 21. Further, the Ya-axis direction corresponds to a normal direction of a front surface 21a of the first controller 21. By using the detection result of the acceleration sensor 23, it is possible to determine a movement of the first controller 21.

An operation signal indicating a state of the first controller 21 is transmitted every predetermined cycle (for example, every 1/60th of a second) from the first controller 21 to the microprocessor 13 via the controller interface 20. The operation signal includes, for example, identification information for identifying the first controller 21, information indicating depressed states of the respective buttons, and information indicating the detection result of the acceleration sensor 23.

Figure 3:
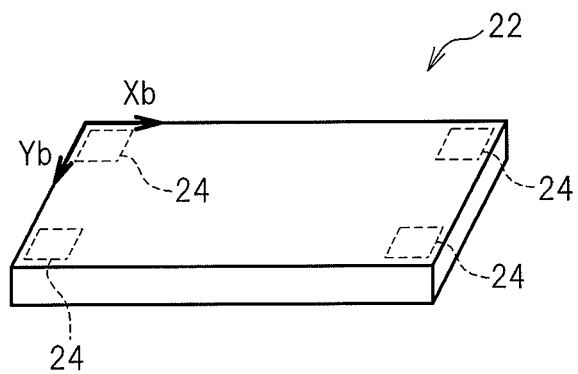
[FIG. 3] A diagram illustrating an example of a second controller.

FIG. 3 is a diagram illustrating an example of the second controller 22. The second controller 22 is a board (mat)-type controller, and is an operation unit for receiving the player's depression operation (stepping operation). The second controller 22 has a plurality of load sensors 24 built thereinto. For example, the load sensors 24 are built into the second controller 22 at its four corners. The load sensors 24 each detect a load applied by the player riding (standing on) the second controller 22, and outputs a numerical value indicating a detection result thereof. The detection results of the respective load sensors 24 are supplied to the microprocessor 13 via the controller interface 20. Based on the detection results of the respective load sensors 24, it is possible to acquire a weight and a position of the center of gravity of the player riding (standing on) the second controller 22. Note that, in FIG. 3, an Xb-axis direction corresponds to a longer side direction of the second controller 22, and a Yb-axis direction corresponds to a shorter side direction of the second controller 22.

Executed on the game device 10 is, for example, a game configured such that a game character riding a skateboard advances while avoiding obstacles.

Figure 4:
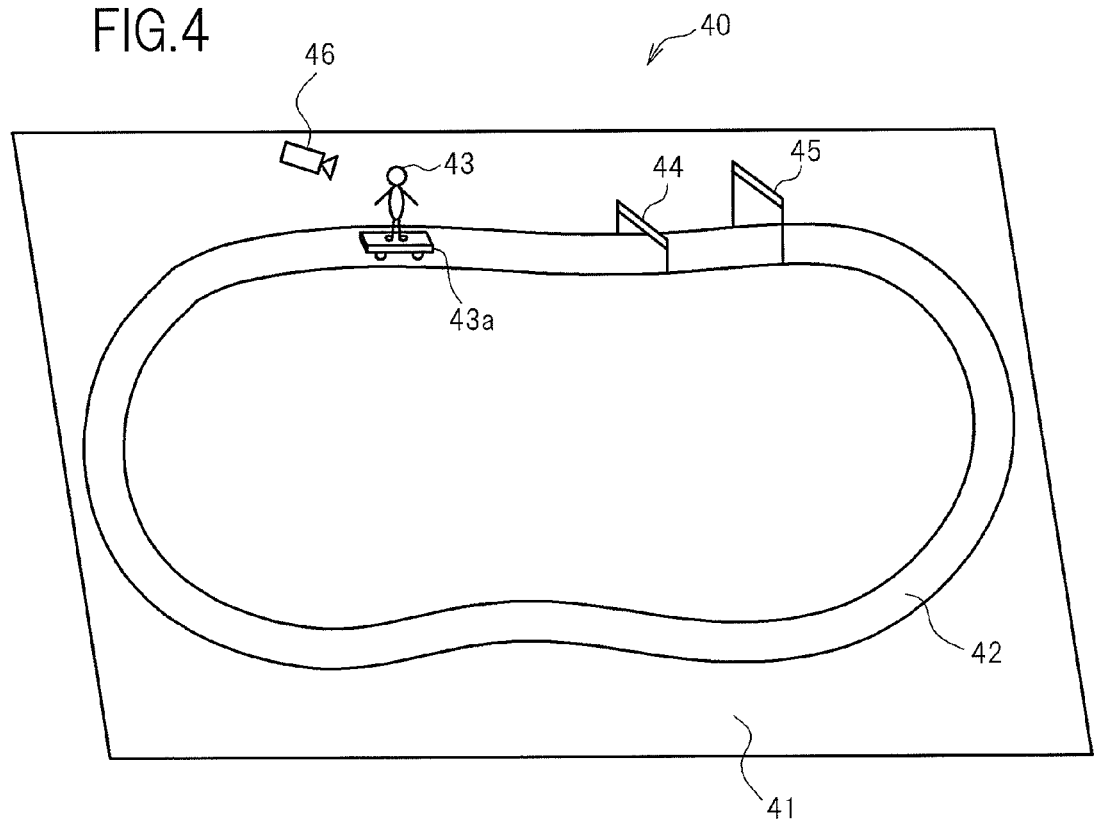
[FIG. 4] A diagram illustrating an example of a game space.

FIG. 4 illustrates an example of a game space 40 built in the main memory 14. As illustrated in FIG. 4, a ground object 41 is located in the game space 40. A course 42 is indicated on the ground object 41. Further, a player character 43, which is a subject to be operated by the player, is located on the ground object 41. The player character 43 is riding a skateboard 43a and moves on the course 42.

In addition, a first obstacle 44 and a second obstacle 45 are located on the ground object 41 (course 42). The first obstacle 44 and the second obstacle 45 are objects that hinder the movement of the player character 43. The first obstacle 44 and the second obstacle 45 illustrated in FIG. 4 are objects similar to hurdles for athletic sports. The first obstacle 44 and the second obstacle 45 have different heights, and the second obstacle 45 is taller than the first obstacle 44. Note that one first obstacle 44 and one second obstacle 45 are illustrated in FIG. 4, but a plurality of first obstacles 44 and a plurality of second obstacles 45 are located in actuality.

Further, a virtual camera 46 is set in the game space 40. For example, the virtual camera 46 is set behind and above the player character 43. A game screen expressing a scene of the game space 40 viewed from the virtual camera 46 is displayed on a display unit 30. Note that the virtual camera 46 may be set in a position of an eye of the player character 43. In this manner, the scene of the game space 40 viewed from the player character 43 may be displayed on the game screen.

Figure 5:
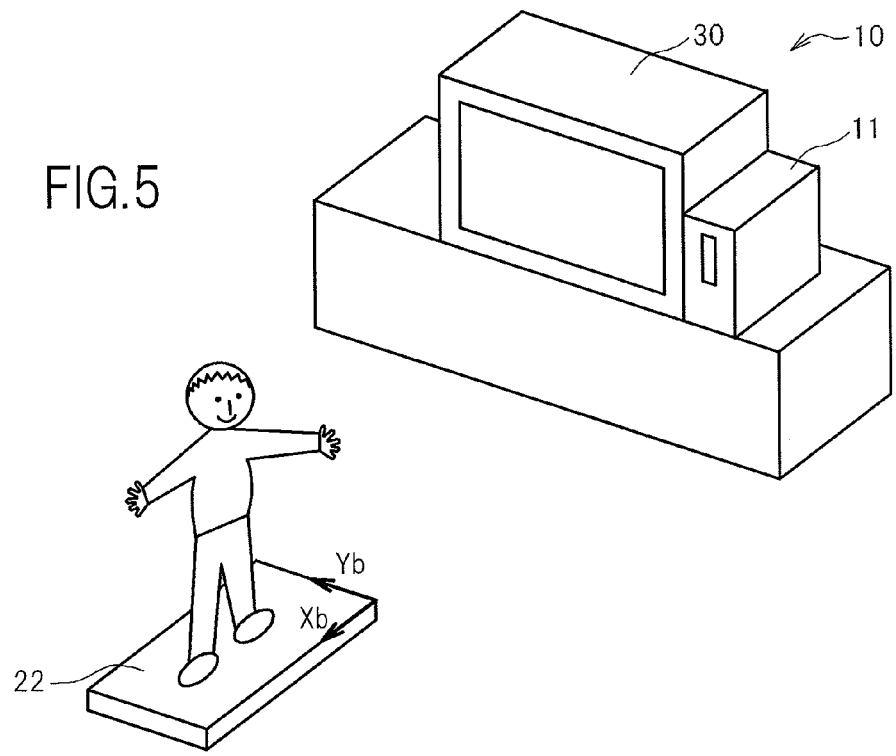
[FIG. 5] A diagram illustrating how a player plays a game.

FIG. 5 is a diagram illustrating how the player plays the game. As illustrated in FIG. 5, the second controller 22 is used for this game. For example, the second controller 22 is located such that the longer side direction (Xb-axis direction) of the second controller 22 substantially coincides with a direction extending from the second controller 22 to the display unit 30. The player rides the second controller 22 to play the game. The player operates the player character 43 by moving on the second controller 22.

For example, the player character 43 is configured to jump when the player moves the center of gravity by putting their weight on one leg (for example, right leg). By jumping, the player character 43 can jump over the first obstacle 44. Therefore, when the player character 43 is approaching the first obstacle 44, the player can cause the player character 43 to avoid the first obstacle 44 by moving the center of gravity.

Further, for example, the player character 43 is configured to squat down when the player squats down on the second controller 22. By squatting down, the player character 43 can pass under the second obstacle 45. Therefore, when the player character 43 is approaching the second obstacle 45, the player can cause the player character 43 to avoid the second obstacle 45 by squatting down.

Note that in the above description, the objects (first obstacle 44 and second obstacle 45) are located to hinder the movement of the player character 43, but game characters (first enemy character and second enemy character) may be located to hinder the movement of the player character 43. In this case, the first enemy character may be set as a game character shorter in height than the second enemy character. Then, by jumping, the player character 43 may jump over a head of the first enemy character to thereby dodge the first enemy character. Further, by squatting down, the player character 43 may pass through between legs of the second enemy character to thereby dodge the second enemy character.

Hereinafter, description is given of a technology for preventing the player character 43 from performing an action that is not intended by the player in the game described above.

Figure 6:
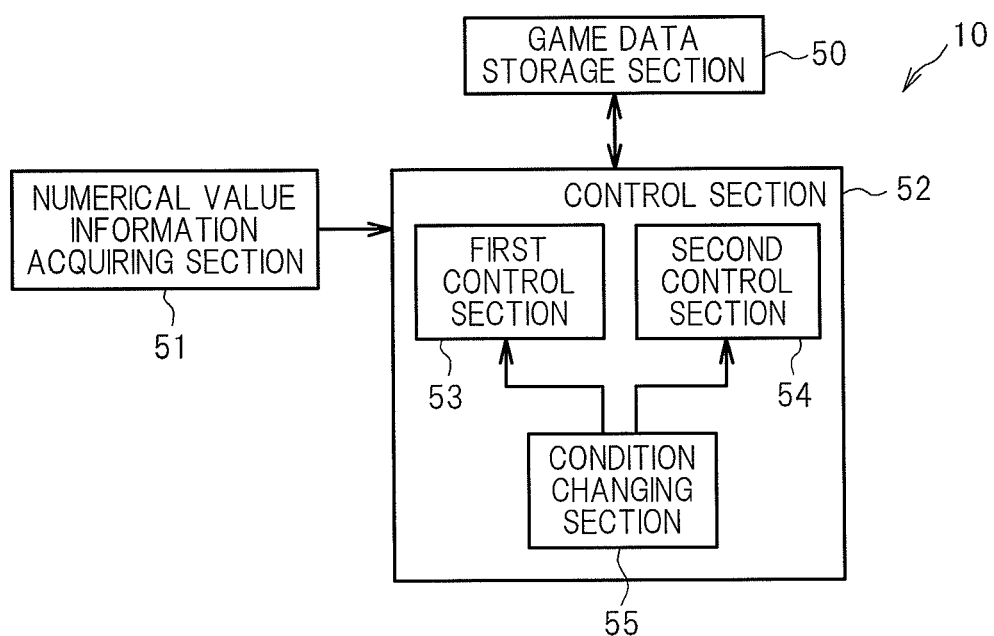
[FIG. 6] A functional block diagram illustrating the game device according to the embodiment of the present invention.

FIG. 6 is a functional block diagram mainly illustrating functions related to the present invention among the functions implemented by the game device 10. As illustrated in FIG. 6, the game device 10 includes a game data storage section 50, a numerical value information acquiring section 51, and a control section 52. The game data storage section 50 is implemented by, for example, the main memory 14 and the optical disc 32, and the numerical value information acquiring section 51 and the control section 52 are implemented mainly by, for example, the microprocessor 13. The numerical value information acquiring section 51 and the control section 52 are implemented by the microprocessor 13 executing the program stored on the optical disc 32.

The game data storage section 50 stores data necessary to execute the game. For example, the game data storage section 50 stores data indicating positions of the first obstacle 44 and the second obstacle 45. Further, for example, the game data storage section 50 stores data indicating a current state of the player character 43. For example, data indicating a current position of the player character 43 is stored. Further stored is, for example, data indicating which of (1) a state of standing on the skateboard 43a, (2) a state of squatting down on the skateboard 43a, and (3) a jumping state the player character 43 is in.

The numerical value information acquiring section 51 acquires numerical value information corresponding to a motion of the player. In the case of this embodiment, the numerical value information acquiring section 51 acquires the numerical value information corresponding to the motion of the player based on the detection results of the respective load sensors 24 of the second controller 22.

For example, the numerical value information acquiring section 51 acquires a moving distance of the center of gravity of the player as the above-mentioned numerical value information based on the detection results of the respective load sensors 24 of the second controller 22. Details thereof are described later (see Step S102 of FIG. 7).

Further, for example, the numerical value information acquiring section 51 acquires a reduced amount of the weight of the player as the above-mentioned numerical value information based on the detection results of the respective load sensors 24 of the second controller 22. When the player performs a squatting action abruptly, the loads detected by the respective load sensors 24 of the second controller 22 temporarily reduce. As a result, the weight of the player obtained from the detection results of the respective load sensors 24 also temporarily reduces. Therefore, the numerical value information acquiring section 51 acquires the reduced amount of the weight of the player for use as basic information for determining whether or not the player has performed the squatting action. Details thereof are described later (see Step S103 of FIG. 7).

The control section 52 executes control of the subject to be operated by the player. In the case of this embodiment, the player character 43 corresponds to the "subject to be operated". For example, the control section 52 updates the position of the player character 43 so that the player character 43 moves on a track (course 42) determined in advance at a predetermined speed.

Further, based on the numerical value information acquired by the numerical value information acquiring section 51, the control section 52 causes the player character 43 to perform an action for dealing with an object or a character. The control section 52 includes a first control section 53, a second control section 54, and a condition changing section 55.

The first control section 53 causes the subject to be operated to perform a first action for dealing with a first object or a first character in a case where the numerical value information acquired by the numerical value information acquiring section 51 satisfies a first condition. For example, the first obstacle 44 corresponds to the "first object". Further, for example, the above-mentioned first enemy character corresponds to the "first character".

Further, the "first action for dealing with a first object or a first character" refers to, for example, an action for dodging the first object or the first character. In the case of this embodiment, the jumping action corresponds to the "first action". Note that, the "first action for dealing with a first object or a first character" may be, for example, an action for destroying the first object or an action for eliminating the first character.

Further, the "first condition" refers to, for example, a condition as to whether or not a first numerical value based on the numerical value information acquired by the numerical value information acquiring section 51 is larger than a first reference value. In the case of this embodiment, the "first condition" is a condition for determining whether or not the player has moved the center of gravity of their body. Specifically, the "first condition" is a condition as to whether or not the moving distance (first numerical value) of the center of gravity of the player is longer than a reference moving distance (first reference value).

The second control section 54 causes the subject to be operated to perform a second action for dealing with a second object or a second character in a case where the numerical value information acquired by the numerical value information acquiring section 51 satisfies a second condition. For example, the second obstacle 45 corresponds to the "second object". Further, for example, the above-mentioned second enemy character corresponds to the "second character".

Further, the "second action for dealing with a second object or a second character" refers to, for example, an action for dodging the second object or the second character. In the case of this embodiment, the squatting action corresponds to the "second action". Note that the "second action for dealing with a second object or a second character" may be, for example, an action for destroying the second object or an action for eliminating the second character.

Further, the "second condition" refers to, for example, a condition as to whether or not a second numerical value based on the numerical value information acquired by the numerical value information acquiring section 51 is larger than a second reference value. In the case of this embodiment, the "second condition" is a condition for determining whether or not the player has performed a squatting action. As described above, when the player performs the squatting action abruptly, the weight of the player obtained from the detection results of the respective load sensors 24 temporarily reduces. Therefore, by determining whether or not the temporarily reduced amount of the weight of the player is larger than a reference reduced amount, it is possible to determine whether or not the player has performed the squatting action. Therefore, the "second condition" is a condition as to whether or not the reduced amount (second numerical value) of the weight of the player is larger than a reference reduced amount (second reference value).

The condition changing section 55 changes the first condition based on the position of at least one of the subject to be operated, and the object or the character. Specifically, the condition changing section 55 makes a setting so that the numerical value information acquired by the numerical value information acquiring section 51 is less likely to satisfy the first condition for a case where the object or the character to be subsequently dealt with by the subject to be operated is the second object or the second character, compared to the first condition for a case where the object or the character to be subsequently dealt with by the subject to be operated is the first object or the first character.

As described above, in the case of this embodiment, the "first condition" is a condition as to whether or not the moving distance of the center of gravity of the player is longer than the reference moving distance. Therefore, the condition changing section 55 makes a setting so that the reference moving distance for a case where the obstacle to be subsequently dealt with by the player character 43 is the second obstacle 45 (in other words, a case where the player character 43 is approaching the second obstacle 45) is longer than the reference moving distance for a case where the obstacle to be subsequently dealt with by the player character 43 is the first obstacle 44 (in other words, a case where the player character 43 is approaching the first obstacle 44).

In an attempt to perform the squatting action in order to cause the player character 43 to dodge the second obstacle 45, the player may involuntarily move the center of gravity of their body. That is, the player may involuntarily perform a motion for causing the player character 43 to perform an action (jumping action) different from the squatting action regardless of their intention to cause the player character 43 to perform the squatting action. In such a case, if the player character 43 performs the jumping action, the player character 43 performs an action that is not intended by the player, with which the player feels dissatisfied.

In this respect, in this embodiment, in the case where the obstacle to be subsequently dealt with by the player character 43 is the second obstacle 45 (in other words, the case where the player is likely to intend to cause the player character 43 to perform the squatting action), the reference moving distance is set to a long distance. As a result, even if the player involuntarily moves the center of gravity of their body to a small extent, the player character 43 does not perform the jumping action. That is, it is possible to prevent the player character 43 from performing an action that is not intended by the player.

Further, the condition changing section 55 may change the second condition based on the position of at least one of the subject to be operated, and the object or the character. Specifically, the condition changing section 55 may make a setting so that the numerical value information acquired by the numerical value information acquiring section 51 is less likely to satisfy the second condition for a case where the object or the character to be subsequently dealt with by the subject to be operated is the first object or the first character, compared to the second condition for a case where the object or the character to be subsequently dealt with by the subject to be operated is the second object or the second character.

As described above, in the case of this embodiment, the "second condition" is a condition as to whether or not the temporarily reduced amount of the weight of the player is larger than the reference reduced amount. Therefore, the condition changing section 55 makes a setting so that the reference reduced amount for a case where the obstacle to be subsequently dealt with by the player character 43 is the first obstacle 44 (in other words, a case where the player character 43 is approaching the first obstacle 44) is larger than the reference reduced amount for a case where the obstacle to be subsequently dealt with by the player character 43 is the second obstacle 45 (in other words, a case where the player character 43 is approaching the second obstacle 45).

In an attempt to move the center of gravity of their body in order to cause the player character 43 to dodge the first obstacle 44, the player may involuntarily perform the squatting action to a small extent. That is, the player may involuntarily perform a motion for causing the player character 43 to perform an action (squatting action) different from the jumping action regardless of their intention to cause the player character 43 to perform the jumping action. In such a case, if the player character 43 performs the squatting action, the player character 43 performs an action that is not intended by the player, with which the player feels dissatisfied.

In this respect, in this embodiment, in the case where the obstacle to be subsequently dealt with by the player character 43 is the first obstacle 44 (in other words, the case where the player is likely to intend to cause the player character 43 to perform the jumping action), the reference reduced amount is set to a large value. As a result, even if the player involuntarily performs a squatting action to a small extent, the player character 43 does not perform the squatting action. That is, it is possible to prevent the player character 43 from performing an action that is not intended by the player.

Figure 7:
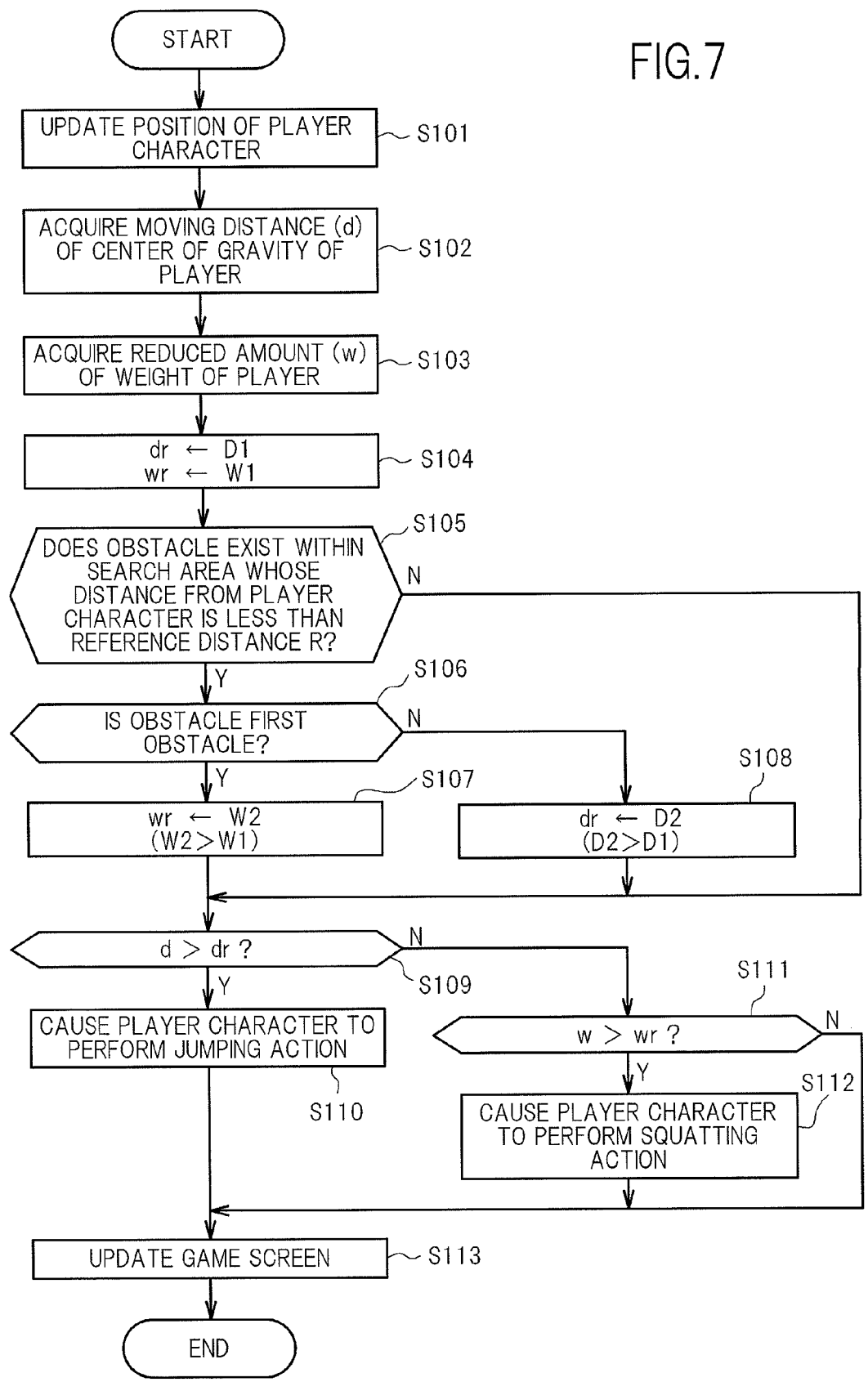
[FIG. 7] A flowchart illustrating an example of processing executed by the game device.

Next, description is given of processing executed by the game device 10. FIG. 7 is a flowchart illustrating the processing executed by the game device 10 every predetermined time (for example, every 1/30th of a second). The microprocessor 13 executes the processing illustrated in FIG. 7 according to the program read from the optical disc 32. The numerical value information acquiring section 51 and the control section 52 are implemented by the microprocessor 13 executing the processing illustrated in FIG. 7.

As illustrated in FIG. 7, first, the microprocessor 13 (control section 52) updates the position of the player character 43 (S101). That is, the microprocessor 13 updates the position of the player character 43 so that the player character 43 moves on the course 42 at the predetermined speed. Note that when the position of the player character 43 is updated, the position of the virtual camera 46 is also updated based on the updated position of the player character 43.

Further, the microprocessor 13 (numerical value information acquiring section 51) calculates the moving distance (d) of the center of gravity of the player (S102). In this Step S102, first, the detection results of the respective load sensors 24 of the second controller 22 are acquired. Subsequently, based on the detection results of the respective load sensors 24, the position of the center of gravity of the player is calculated. Then, a distance between the previously calculated position of the center of gravity and the currently calculated position of the center of gravity is acquired as the moving distance (d).

Further, the microprocessor 13 (numerical value information acquiring section 51) calculates the reduced amount (w) of the weight of the player (S103). In this Step S103, first, the detection results of the respective load sensors 24 of the second controller 22 are acquired. Subsequently, based on the detection results of the respective load sensors 24, the weight of the player is calculated. Then, the reduced amount (w) of the weight is acquired by subtracting the currently calculated weight from the previously calculated weight.

After that, the microprocessor 13 initializes a reference moving distance (dr) to a constant D1 and initializes a reference reduced amount (wr) to a constant W1 (S104).

Further, the microprocessor 13 determines whether or not an obstacle exists within a search area whose distance from the player character 43 is less than a reference distance R (S105). Note that if both the first obstacle 44 and the second obstacle 45 exist within the search area, attention is focused only on one of the first obstacle 44 and the second obstacle 45 that is closer to the player character 43 while the other is ignored in processing (S106) described below.

If an obstacle exists within the search area, the microprocessor 13 determines whether or not the obstacle is the first obstacle 44 (S106). If the obstacle existing within the search area is the first obstacle 44, the microprocessor 13 (condition changing section 55) updates the reference reduced amount (wr) to a constant W2 (S107). Here, the constant W2 is a value larger than the constant W1.

On the other hand, if the obstacle existing within the search area is not the first obstacle 44, that is, if the obstacle existing within the search area is the second obstacle 45, the microprocessor 13 (condition changing section 55) updates the reference moving distance (dr) to a constant D2 (S108). Here, the constant D2 is a distance longer than the constant D1.

When the processing of Step S107 or S108 is finished, or if it is determined in Step S105 that an obstacle does not exist within the search area, the microprocessor 13 determines whether or not the moving distance (d) of the center of gravity calculated in Step S102 is larger than the reference moving distance (dr) (S109). Then, if the moving distance (d) is larger than the reference moving distance (dr), the microprocessor 13 (first control section 53) causes the player character 43 to perform the jumping action (S110).

On the other hand, if the moving distance (d) is not larger than the reference moving distance (dr), the microprocessor 13 determines whether or not the reduced amount (w) of the weight calculated in Step S103 is larger than the reference reduced amount (wr) (S111). Then, if the reduced amount (w) of the weight is larger than the reference reduced amount (wr), the microprocessor 13 (second control section 54) causes the player character 43 to perform the squatting action (S112).

On the other hand, if the reduced amount (w) of the weight is not larger than the reference reduced amount (wr), the player character 43 performs neither the jumping action nor the squatting action, and the player character 43 remains standing on the skateboard 43a.

After the processing of Steps S101 to S112 is finished, the microprocessor 13 updates the game screen (S113). That is, the game screen expressing the scene of the game space 40 viewed from the virtual camera 46 is generated and displayed on the display unit 30.

According to the game device 10 described above, it is possible to prevent the player character 43 from performing an action that is not intended by the player.

Note that the present invention is not limited to the embodiment described above.

Modified Example 1

For example, in principle, the reference moving distance (dr) may be set to a relatively long distance (D2) to thereby make the player character 43 less likely to perform the jumping action. Then, only in the case where the player character 43 is approaching the first obstacle 44, the reference moving distance (dr) may be set to a relatively short distance (D1) to thereby make the player character 43 more likely to perform the jumping action.

In this case, in Step S104 of FIG. 7, the reference moving distance (dr) is initialized to the constant D2. Then, if it is determined in Step S106 that the obstacle existing within the search area is the first obstacle 44, the reference moving distance (dr) is changed in Step S107 instead of the reference reduced amount (dw). That is, the reference moving distance (dr) is changed to the constant D1. With this configuration, only in the case where the obstacle to be subsequently dodged by the player character 43 is the first obstacle 44 (in other words, the case where the first obstacle 44 exists within the search area), the reference moving distance (dr) is set to the relatively short distance (D1) to make the player character 43 more likely to perform the jumping action. On the other hand, in the case where the obstacle to be subsequently dodged by the player character 43 is not the first obstacle 44 (in other words, the case where the first obstacle 44 does not exist within the search area), the reference moving distance (dr) is set to the relatively long distance (D2) to make the player character 43 less likely to perform the jumping action.

Further, for example, in principle, the reference reduced amount (wr) may be set to a relatively large value (W2) to thereby make the player character 43 less likely to perform the squatting action. Then, only in the case where the player character 43 is approaching the second obstacle 45, the reference reduced amount (wr) may be set to a relatively small value (W1) to thereby make the player character 43 more likely to perform the squatting action.

In this case, in Step S104 of FIG. 7, the reference reduced amount (wr) is initialized to the constant W2. Then, if it is determined in Step S106 that the obstacle existing within the search area is the second obstacle 45 (S106: N), the reference reduced amount (wr) is changed in Step S108 instead of the reference moving distance (dr). That is, the reference reduced amount (wr) is changed to the constant W1. With this configuration, only in the case where the obstacle to be subsequently dodged by the player character 43 is the second obstacle 45 (in other words, the case where the second obstacle 45 exists within the search area), the reference reduced amount (wr) is set to the relatively small value (W1) to make the player character 43 more likely to perform the squatting action. On the other hand, in the case where the obstacle to be subsequently dodged by the player character 43 is not the second obstacle 45 (in other words, the case where the second obstacle 45 does not exist within the search area), the reference reduced amount (wr) is set to the relatively large value (W2) to make the player character 43 less likely to perform the squatting action.

With the above-mentioned configuration, it is also possible to prevent the player character 43 from performing an action that is not intended by the player.

Modified Example 2

Further, for example, a moving speed of the player character 43 may change. In this case, in Step S105 of FIG. 7, a reference distance R may be decided based on the moving speed of the player character 43. For example, the reference distance R may be set longer in a case where the moving speed of the player character 43 is relatively fast than in a case where the moving speed of the player character 43 is relatively slow.

In the case where the moving speed of the player character 43 is relatively fast with the reference distance R fixed, the time required for the player character 43 to reach the obstacle after the obstacle (first obstacle 44 or second obstacle 45) comes to be included in the search area becomes shorter than in the case where the moving speed of the player character 43 is relatively slow.

In the case where the time required for the player character 43 to reach the obstacle after the obstacle (first obstacle 44 or second obstacle 45) comes to be included in the search area is short, the player may perform the motion for causing the player character 43 to perform the jumping action or the squatting action before the obstacle comes to be included in the search area. Then, in this case, the player character 43 may perform an action that is not intended by the player. That is, it becomes impossible to sufficiently prevent the player character 43 from performing an action that is not intended by the player.

In this respect, according to Modified Example 2, even in the case where the moving speed of the player character 43 changes, it is possible to keep the time required for the player character 43 to reach the obstacle after the obstacle (first obstacle 44 or second obstacle 45) comes to be included in the search area substantially constant. Further, it is possible to prevent the player from performing the motion for causing the player character 43 to perform the jumping action or the squatting action before the obstacle comes to be included in the search area. As a result, it is possible to sufficiently prevent the player character 43 from performing an action that is not intended by the player.

Modified Example 3

Further, for example, the first obstacle 44 and the second obstacle 45 may be configured to move toward the player character 43 on the course 42 instead of causing the player character 43 to move on the course 42. In this case, in Step S101 of FIG. 7, the positions of the first obstacle 44 and the second obstacle 45 are updated instead of updating the position of the player character 43.

Further, in this case, the moving speeds of the first obstacle 44 and the second obstacle 45 may change. Then, in the same manner as in Modified Example 2, in Step S105 of FIG. 7, the reference distance R may be decided based on the moving speed of the first obstacle 44 or the second obstacle 45. For example, the reference distance R may be set longer in a case where the moving speed of the first obstacle 44 or the second obstacle 45 is relatively fast than in a case where the moving speed of the first obstacle 44 or the second obstacle 45 is relatively slow.

Note that both the player character 43 and the first obstacle 44 and second obstacle 45 may move on the course 42. In this case, in Step S105 of FIG. 7, the reference distance R may be decided based on a relative moving speed of the player character 43 with respect to the first obstacle 44 or the second obstacle 45. For example, the reference distance R may be set longer in a case where the relative moving speed of the player character 43 is relatively fast than in a case where the relative moving speed of the player character 43 is relatively slow.

Modified Example 4

Further, for example, in Step S109 of FIG. 7, the microprocessor 13 (first control section 53) may determine whether or not the inverse (1/d) of the moving distance (d) of the center of gravity is smaller than (1/dr). Then, the microprocessor 13 (first control section 53) may cause the player character 43 to perform the jumping action if (1/d) is smaller than (1/dr) (S110). That is, the first control section 53 may cause the player character 43 to perform the first action (jumping action) if the numerical value (1/d) based on the numerical value information acquired by the numerical value information acquiring section 51 is smaller than the reference value (1/dr).

Note that in this case, in Step S108, the microprocessor 13 (condition changing section 55) changes the value dr from D1 to D2 (D2>D1) to thereby change the reference value (1/dr) to a smaller value. That is, the condition changing section 55 sets the reference value (1/dr) for the case where the obstacle to be subsequently dealt with by the player character 43 is the second obstacle 45 to a value (1/D2) smaller than the reference value (1/D1) for the case where the obstacle to be subsequently dealt with by the player character 43 is the first obstacle 44.

Further, for example, in Step S111 of FIG. 7, the microprocessor 13 (second control section 54) may determine whether or not the inverse (1/w) of the reduced amount (w) of the weight is smaller than (1/wr). Then, the microprocessor 13 (second control section 54) may cause the player character 43 to perform the squatting action if (1/w) is smaller than (1/wr) (S112). That is, the second control section 54 may cause the player character 43 to perform the second action (squatting action) if the numerical value (1/w) based on the numerical value information acquired by the numerical value information acquiring section 51 is smaller than the reference value (1/wr).

Note that in this case, in Step S107, the microprocessor 13 (condition changing section 55) changes the value wr from W1 to W2 (W2>W1) to thereby change the reference value (1/wr) to a smaller value. That is, the condition changing section 55 sets the reference value (1/wr) for the case where the obstacle to be subsequently dealt with by the player character 43 is the first obstacle 44 to a value (1/W2) smaller than the reference value (1/W1) for the case where the obstacle to be subsequently dealt with by the player character 43 is the second obstacle 45.

Modified Example 5

Further, for example, the player may use the first controller 21 instead of the second controller 22 to play the game.

Figure 8:
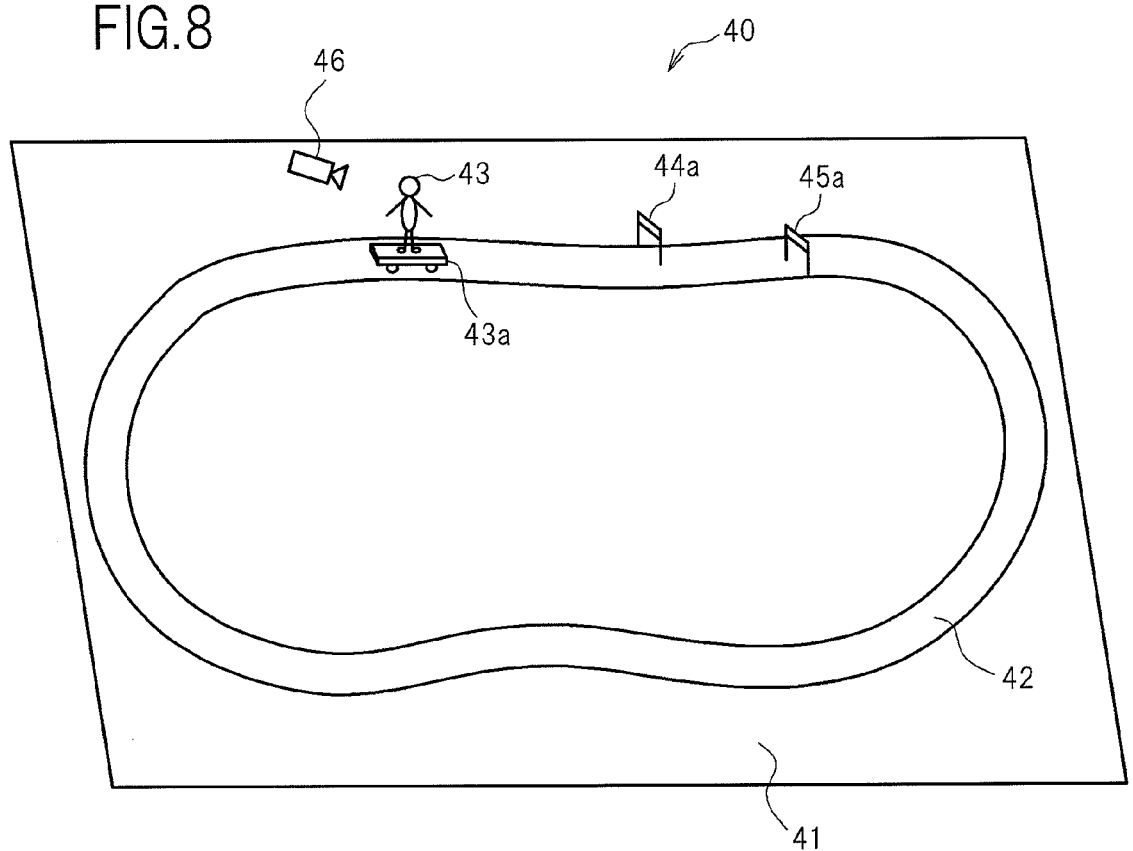
[FIG. 8] A diagram illustrating another example of the game space.

FIG. 8 illustrates an example of the game space 40 according to Modified Example 5. As illustrated in FIG. 8, in Modified Example 5, a first obstacle 44a and a second obstacle 45a are located on the ground object 41 (course 42). The first obstacle 44a is an obstacle that hinders the player character 43 from moving on the left side of the course 42, and the second obstacle 45a is an obstacle that hinders the player character 43 from moving on the right side of the course 42. Note that one first obstacle 44a and one second obstacle 45a are illustrated in FIG. 8, but a plurality of first obstacles 44a and a plurality of second obstacles 45a are located in actuality.

Figure 9:
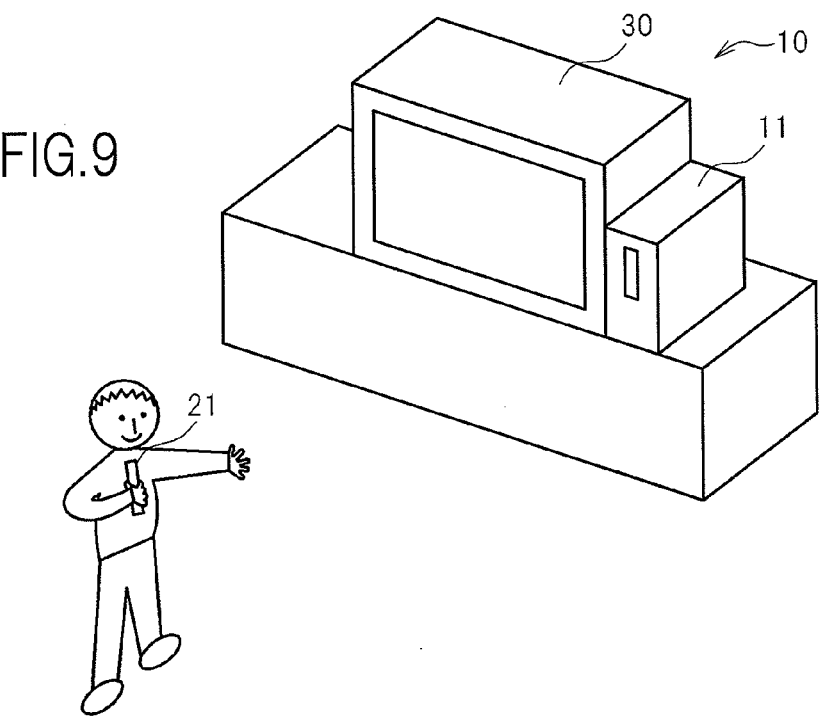
[FIG. 9] A diagram illustrating how the player plays the game.

FIG. 9 is a diagram illustrating how the player plays the game. As illustrated in FIG. 9, the player stands with the left side surface of their body directed toward the display unit 30, and plays the game by holding the first controller 21 with one hand so that a tip end (positive Za-axis direction) of the first controller 21 is directed upward with the back surface (surface on the side opposite to the front surface 21a) of the first controller 21 pressed against their chest.

In Modified Example 5, the player character 43 is configured to move to the right edge of the course 42 to dodge the first obstacle 44a if the player bends forward when the player character 43 is approaching the first obstacle 44a. Further, the player character 43 is configured to move to the left edge of the course 42 to dodge the second obstacle 45a if the player bends the body backward when the player character 43 is approaching the second obstacle 45a.

Operations of the numerical value information acquiring section 51, the first control section 53, the second control section 54, and the condition changing section 55 according to Modified Example 5 are as follows.

That is, the numerical value information acquiring section 51 acquires the numerical value information corresponding to the motion of the player based on the detection results of the acceleration sensor 23 of the first controller 21.

For example, the numerical value information acquiring section 51 acquires an acceleration in a positive Ya-axis direction as the above-mentioned numerical value information based on the detection results of the acceleration sensor 23 of the first controller 21. When the player bends forward, the acceleration in the positive Ya-axis direction detected by the acceleration sensor 23 of the first controller 21 increases. Therefore, the numerical value information acquiring section 51 acquires the acceleration in the positive Ya-axis direction for use as basic information for determining whether or not the player has bent forward.

Further, for example, the numerical value information acquiring section 51 acquires an acceleration in a negative Ya-axis direction as the above-mentioned numerical value information based on the detection results of the acceleration sensor 23 of the first controller 21. When the player bends the body backward, the acceleration in the negative Ya-axis direction detected by the acceleration sensor 23 of the first controller 21 increases. Therefore, the numerical value information acquiring section 51 acquires the acceleration in the negative Ya-axis direction for use as basic information for determining whether or not the player has bent the body backward.

In the case where the numerical value information acquired by the numerical value information acquiring section 51 satisfies the first condition, the first control section 53 causes the player character 43 (subject to be operated) to perform the first action for dealing with the first obstacle 44a (first object). In Modified Example 5, an action of moving to the right edge of the course 42 corresponds to the "first action".

Further, the "first condition" is a condition for determining whether or not the player has bent forward. As described above, when the player bends forward, the acceleration in the positive Ya-axis direction increases. Therefore, it is possible to determine whether or not the player has bent forward by determining whether or not the acceleration in the positive Ya-axis direction has become larger than a first reference acceleration. Therefore, the "first condition" is a condition as to whether or not the acceleration in the positive Ya-axis direction has become larger than the first reference acceleration.

In the case where the numerical value information acquired by the numerical value information acquiring section 51 satisfies the second condition, the second control section 54 causes the player character 43 (subject to be operated) to perform the second action for dealing with the second obstacle 45a (second object). In Modified Example 5, an action of moving to the left edge of the course 42 corresponds to the "second action".

Further, the "second condition" is a condition for determining whether or not the player has bent the body backward. When the player bends the body backward, the acceleration in the negative Ya-axis direction increases. Therefore, it is possible to determine whether or not the player has bent the body backward by determining whether or not the acceleration in the negative Ya-axis direction has become larger than a second reference acceleration. Therefore, the "second condition" is a condition as to whether or not the acceleration in the negative Ya-axis direction has become larger than the second reference acceleration.

The condition changing section 55 changes the first condition based on the position of at least one of the player character 43, the first obstacle 44a, and the second obstacle 45a. Specifically, the condition changing section 55 sets the first reference acceleration for a case where the obstacle to be subsequently dodged by the player character 43 is the second obstacle 45a to an acceleration larger than the first reference acceleration for a case where the obstacle to be subsequently dodged by the player character 43 is the first obstacle 44a.

In an attempt to bend the body backward in order to cause the player character 43 to move to the left edge of the course 42, the player may involuntarily bend forward a little temporarily before bending the body backward. In such a case, if the player character 43 performs the action of moving to the right edge of the course 42 due to the fact that the player bends forward temporarily, the player character 43 performs an action that is not intended by the player. As a result, the player feels dissatisfied.

In this respect, in this embodiment, the first reference acceleration for the case where the obstacle to be subsequently dodged by the player character 43 is the second obstacle 45a (in other words, the case where the player character 43 is approaching the second obstacle 45a) is set to the acceleration larger than the first reference acceleration for the case where the obstacle to be subsequently dodged by the player character 43 is the first obstacle 44a (in other words, the case where the player character 43 is approaching the first obstacle 44a). As a result, even if the player involuntarily bends forward a little, the player character 43 does not perform the action of moving to the right edge of the course 42. That is, it is possible to prevent the player character 43 from performing an action that is not intended by the player.

In the same manner, the condition changing section 55 may change the second condition based on the position of at least one of the player character 43, the first obstacle 44a, and the second obstacle 45a. Specifically, the condition changing section 55 may set the second reference acceleration for the case where the obstacle to be subsequently dodged by the player character 43 is the first obstacle 44a to an acceleration larger than the second reference acceleration for the case where the obstacle to be subsequently dodged by the player character 43 is the second obstacle 45a.

Note that the player may use both the first controller 21 and the second controller 22 to play the game. In this case, the first obstacle 44 and second obstacle 45 (see FIG. 4), and the first obstacle 44a and second obstacle 45a (see FIG. 8), may be located in the game space 40.

Other Modified Example

The present invention can be applied to a game other than the "game configured such that a game character riding a skateboard advances while avoiding an obstacle". For example, the present invention can be applied to a game configured such that the subject to be operated by the player is an automobile or a motorcycle.

The invention claimed is:

1. A game device, which executes a game configured to move a subject to be operated by a player with respect to a plurality of objects or characters within a game space, the game device comprising:
   a numerical value information acquirer that acquires numerical value information corresponding to a motion of the player; and
   a controller that controls the subject to perform an action in encountering a first object or a first character when the numerical value information satisfies a threshold condition, and changes, when the object or the character to be subsequently encountered by the subject to be operated is a second object or a second character, the threshold condition so that the numerical value information is less likely to satisfy the threshold condition, compared to when the object or the character to be subsequently encountered by the subject to be operated is the first object or the first character.

2. The game device according to claim 1, wherein:
   the controller controls the subject to perform the action in encountering the first object or the first character in a case where a numerical value based on the numerical value information is larger than a reference value, and sets the reference value for the case where the object or the character to be subsequently encountered by the subject to be operated is the second object or the second character to a value larger than the reference value for the case where the object or the character to be subsequently encountered by the subject to be operated is the first object or the first character.

3. The game device according to claim 1, wherein:
   the controller controls the subject to perform the action in encountering the first object or the first character in a case where a numerical value based on the numerical value information is smaller than a reference value, and sets the reference value for the case where the object or the character to be subsequently encountered by the subject to be operated is the second object or the second character to a value smaller than the reference value for the case where the object or the character to be subsequently encountered by the subject to be operated is the first object or the first character.

4. The game device according to claim 1, wherein:
when a distance between the subject and the second object or the second character is shorter than a reference distance, the controller controls so that the numerical value information is less likely to satisfy the threshold condition, compared to when a distance between the subject and the first object or the first character is shorter than the reference distance, and
changes the reference distance based on a moving speed of at least one of the subject and the object or the character.

5. A method of controlling a game device which comprises at least one processor and executes a game configured to move a subject to be operated by a player with respect to a plurality of objects or characters within a game space, the method comprising:
acquiring numerical value information corresponding to a motion of the player; and
controlling, using the at least one processor, the subject to perform an action in encountering a first object or a first character when the numerical value information satisfies a threshold condition, and changes, when the object or the character to be subsequently encountered by the subject to be operated is a second object or a second character, the threshold condition so that the numerical value information is less likely to satisfy the threshold condition, compared to when the object or the character to be subsequently encountered by the subject to be operated is the first object or the first character.

6. A non-transitory computer-readable information storage medium storing a program for causing a computer to function as a game device which executes a game configured to move a subject to be operated by a player with respect to a plurality of objects or characters within a game space,
the program further causing the computer to function as:
a numerical value information acquirer that acquires numerical value information corresponding to a motion of the player; and
a controller that controls the subject to perform an action in encountering a first object or a first character when the numerical value information satisfies a threshold condition, and changes, when the object or the character to be subsequently encountered by the subject to be operated is a second object or a second character, the threshold condition so that the numerical value information is less likely to satisfy the threshold condition, compared to when the object or the character to be subsequently encountered by the subject to be operated is the first object or the first character.

7. A game device, which executes a game configured to move a subject to be operated by a player with respect to a plurality of objects or characters within a game space, the game device comprising:
a numerical value information acquirer that acquires numerical value information corresponding to a motion of the player; and
a controller that controls the subject to perform an action in encountering a first object or a first character when the numerical value information satisfies a threshold condition, and changes, when the object or the character to be subsequently encountered by the subject to be operated is the first object or the first character, the threshold condition so that the numerical value information is likely to satisfy the threshold condition, compared to when the object or the character to be subsequently encountered by the subject to be operated is a second object or a second character.

8. A method of controlling a game device which comprises at least one processor and executes a game configured to move a subject to be operated by a player with respect to a plurality of objects or characters within a game space, the method comprising:
acquiring numerical value information corresponding to a motion of the player; and
controlling, using the at least one processor, the subject to perform an action in encountering a first object or a first character when the numerical value information satisfies a threshold condition, and changes, when the object or the character to be subsequently encountered by the subject to be operated is the first object or the first character, the threshold condition so that the numerical value information is likely to satisfy the threshold condition, compared to when the object or the character to be subsequently encountered by the subject to be operated is a second object or a second character.

9. A game device which executes a game configured to move a subject to be operated by a player, with respect to a plurality of obstacles that hinder movement of the subject, within a game space, the game device comprising:
a controller that:
acquires sensor data corresponding to a motion of the player; and
controls the subject to perform a jump movement or a squat movement with respect to an obstacle to be encountered, according to whether the sensor data satisfies a jump condition or a squat condition, respectively, and that changes the jump condition or the squat condition based on a type of the obstacle.

10. The game device according to claim 9, wherein the sensor determines a moving distance of a center of gravity of the player and a change in measured weight of the player, and the jump condition is determined by comparing the moving distance with a reference distance, and the squat condition is determined by comparing the change in the measured weight with a reference change amount.

11. The game device according to claim 9, wherein the sensor comprises an acceleration sensor and a plurality of load sensors.

12. A non-transitory computer-readable information storage medium storing a program for causing a computer to function as a game device which executes a game configured to move a subject to be operated by a player with respect to a plurality of objects or characters within a game space,
the program further causing the computer to function as:
a numerical value information acquirer that acquires numerical value information corresponding to a motion of the player; and
a controller that controls the subject to perform an action in encountering a first object or a first character when the numerical value information satisfies a threshold condition, and changes, when the object or the character to be subsequently encountered by the subject to be operated is the first object or the first character, the threshold condition so that the numerical value information is likely to satisfy the threshold condition, compared to when the object or the character to be subsequently encountered by the subject to be operated is a second object or a second character.

13. A game device which executes a game configured to move a subject to be operated by a player with respect to a plurality of obstacles, within a game space, the game device comprising:

a controller that:

acquires sensor data corresponding to a motion of the player; and performs a first action with respect to a first obstacle when the sensor data satisfies a first condition, and changes a second condition in order that the sensor data is less likely to satisfy the second condition than the first condition, the second condition being for performing a second action with respect to a second obstacle that the subject will encounter subsequent to the first obstacle, the second condition being a different condition than the first condition.

14. The game device according to claim 10, wherein the reference distance and the reference change amount are set in advance.

15. The game device according to claim 9, wherein:

when the obstacle is a low obstacle, the controller changes the squat condition in order that the sensor data is less likely to satisfy the squat condition than the jump condition, and when the obstacle is a high obstacle, the controller changes the jump condition in order that the sensor data is less likely to satisfy the jump condition than the squat condition.

16. A method of controlling a game device which comprises at least one processor and executes a game configured to move a subject to be operated by a player with respect to a plurality of obstacles within a game space, the method comprising:

acquiring sensor data corresponding to a motion of the player; and performing, using the at least one processor, a first action with respect to a first obstacle when the sensor data satisfies a first condition, and changing, using the at least one processor, a second condition in order that the sensor data is less likely to satisfy the second condition than the first condition, the second condition being for performing a second action with respect to a second obstacle that the subject will encounter subsequent to the first obstacle, the second condition being a different condition than the first condition.

17. A non-transitory computer-readable information storage medium storing a program for causing a computer to function as a game device which executes a game configured to move a subject to be operated by a player with respect to a plurality of obstacles within a game space, the program further causing the computer to function as:

a controller that:

acquires sensor data corresponding to a motion of the player; and performs a first action with respect to a first obstacle when the sensor data satisfies a first condition, and changes a second condition in order that the sensor data is less likely to satisfy the second condition than the first condition, the second condition being for performing a second action with respect to a second obstacle that the subject will encounter subsequent to the first obstacle, the second condition being a different condition than the first condition.

18. A method of controlling a game device which comprises at least one processor and executes a game configured to move a subject to be operated by a player with respect to a plurality of obstacles within a game space, the method comprising:

acquiring sensor data corresponding to a motion of the player; and controlling, using the at least one processor, the subject to perform a jump movement or a squat movement with respect to an obstacle to be encountered, according to whether the sensor data satisfies a jump condition or a squat condition, respectively, and changing, using the at least one processor, the jump condition or the squat condition based on a type of the obstacle.

19. A non-transitory computer-readable information storage medium storing a program for causing a computer to function as a game device which executes a game configured to move a subject to be operated by a player with respect to a plurality of obstacles within a game space, the program further causing the computer to function as:

a controller that:

acquires sensor data corresponding to a motion of the player; and controls the subject to perform a jump movement or a squat movement with respect to an obstacle to be encountered, according to whether the sensor data satisfies a jump condition or a squat condition, respectively, and changes the jump condition or the squat condition based on a type of the obstacle.

* * * * *